US010725636B2

(12) United States Patent
Jain

(10) Patent No.: US 10,725,636 B2
(45) Date of Patent: Jul. 28, 2020

(54) MODIFICATION, MANIPULATION AND RENDERING OF OBJECT ATTRIBUTES

(71) Applicant: Autodesk, Inc., San Rafael, CA (US)

(72) Inventor: Gaurav Jain, Singapore (SG)

(73) Assignee: AUTODESK, INC., San Rafael, CA (US)

( * ) Notice: Subject to any disclaimer, the term of this patent is extended or adjusted under 35 U.S.C. 154(b) by 442 days.

(21) Appl. No.: 15/421,272

(22) Filed: Jan. 31, 2017

(65) Prior Publication Data
US 2018/0217739 A1    Aug. 2, 2018

(51) Int. Cl.
G06F 3/0484    (2013.01)
G06T 11/60    (2006.01)
G06T 11/00    (2006.01)

(52) U.S. Cl.
CPC ........ G06F 3/04845 (2013.01); G06T 11/001 (2013.01); G06T 11/60 (2013.01); *G06F 3/04842* (2013.01); *G06T 2200/24* (2013.01)

(58) Field of Classification Search
CPC ............. G06F 3/04845; G06F 3/04842; G06F 3/0481; G06F 3/04883; G06F 3/0486; G06F 8/34; G06T 11/001; G06T 11/60; G06T 2200/24
See application file for complete search history.

(56) References Cited

U.S. PATENT DOCUMENTS

2008/0104571 A1*  5/2008  Jaeger ............... G06F 3/0481
                                                                717/113

OTHER PUBLICATIONS

Chao, "Exploring Repeat Grid In Adobe XD", (Nov. 16, 2016), <URL https://www.smashingmagazine.com/2016/11/exploring-repeat-grid-in-adobe-xd/>, p. 1-23 (Year: 2016).*
Work with Smart Objects, https://helpx.adobe.com/photoshop/using/create-smart-objects.html#replace_the_contents_of_a_smart_object, as downloaded Aug. 1, 2016.
Mikutel, I., "10 ways to be more efficient in the new Visio", Sep. 25, 2012, https://blogs.office.com/2012/09/25/10-ways-to-be-more-efficient-in-the-new-visio/, as downloaded Aug. 1, 2016.
MLC PowerPoint Addin [Swap Shapes in PowerPoint], mauriziolacava.com/my-addin/, as downloaded Aug. 1, 2016.

* cited by examiner

*Primary Examiner* — Ajay M Bhatia
*Assistant Examiner* — Mong-Shune Chung
(74) *Attorney, Agent, or Firm* — Gates & Cooper LLP

(57) ABSTRACT

A method, apparatus, and system provides the ability to manipulate multiple digital objects. A plurality of digital objects with attributes are acquired. Two or more of the digital objects are selected. Attributes of the selected digital objects are selected. An interchange operation to be performed with the selected attributes of the selected digital objects is determined. The selected attributes are interchanged between the selected digital objects based on the determined interchange operation. The selected digital objects with interchanged attributes are output.

16 Claims, 10 Drawing Sheets

Rotate frames 404, 410 and 416 anti-clockwise

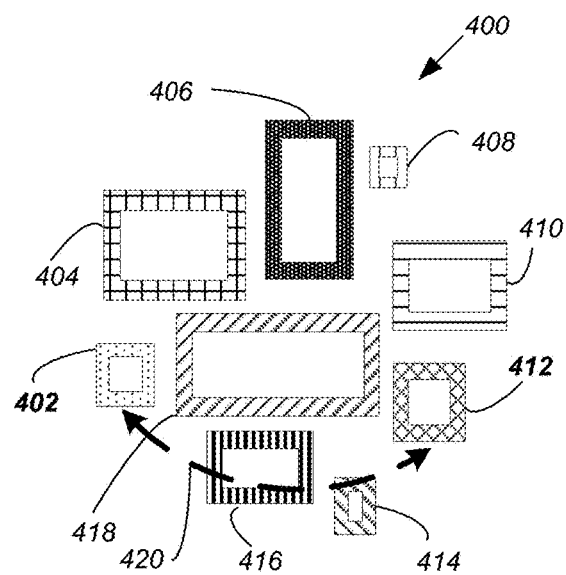
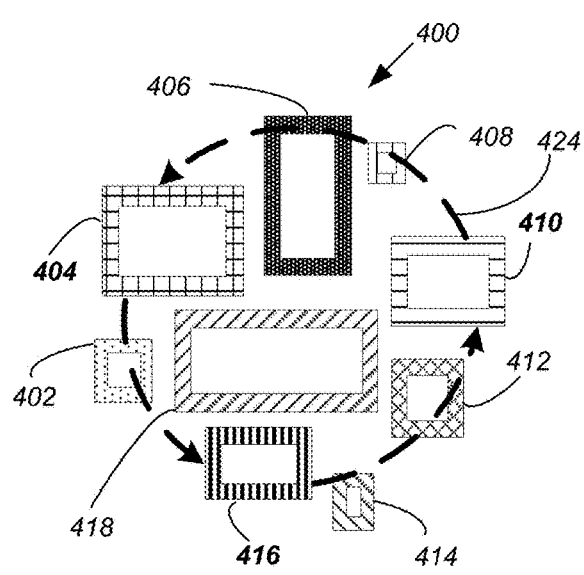
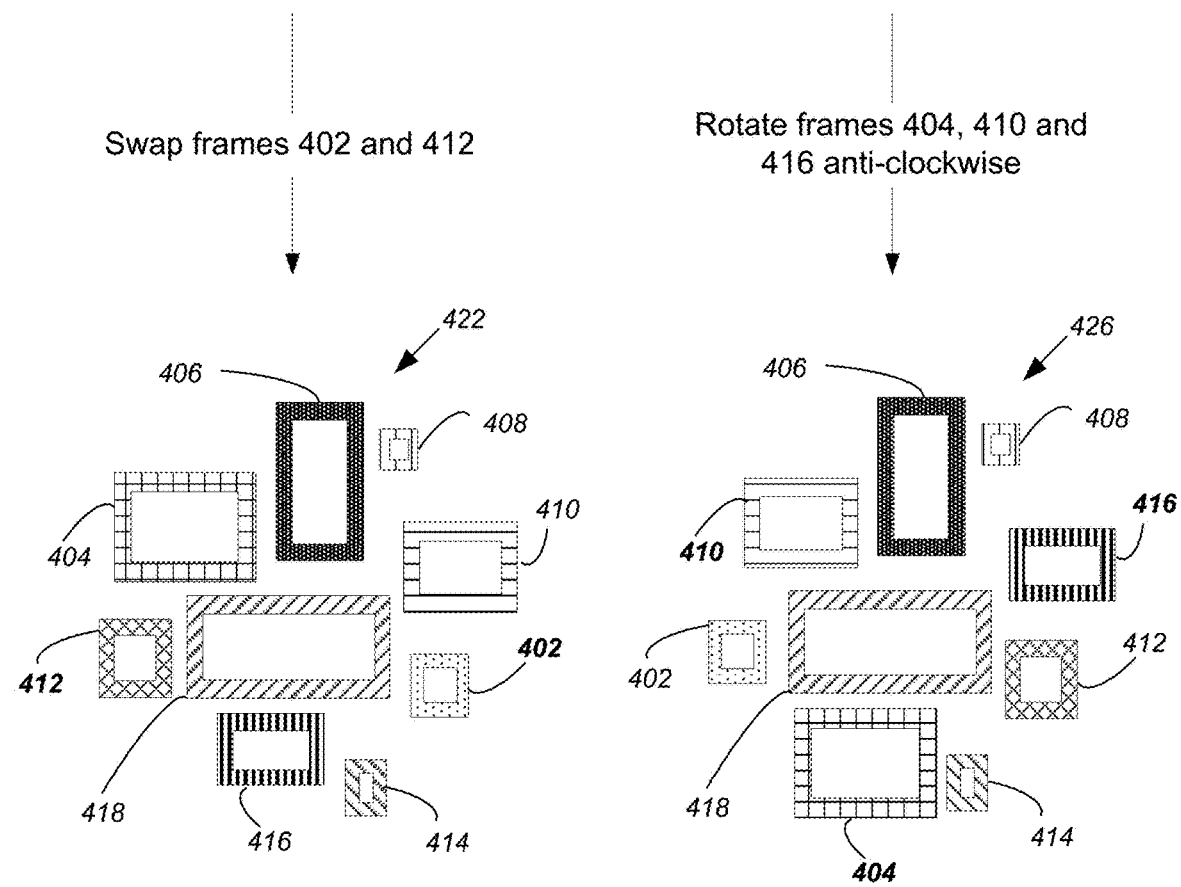
FIG. 4A
FIG. 4C
Swap frames 402 and 412
Rotate frames 404, 410 and 416 anti-clockwise
FIG. 4B
FIG. 4D Swap the colors between the left and right balloons Rotate the colors of the left, center and right balloons one step

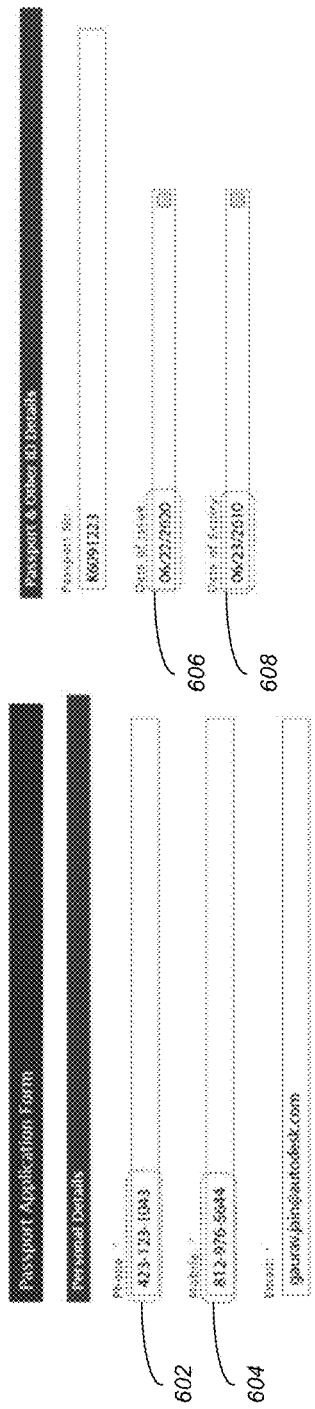
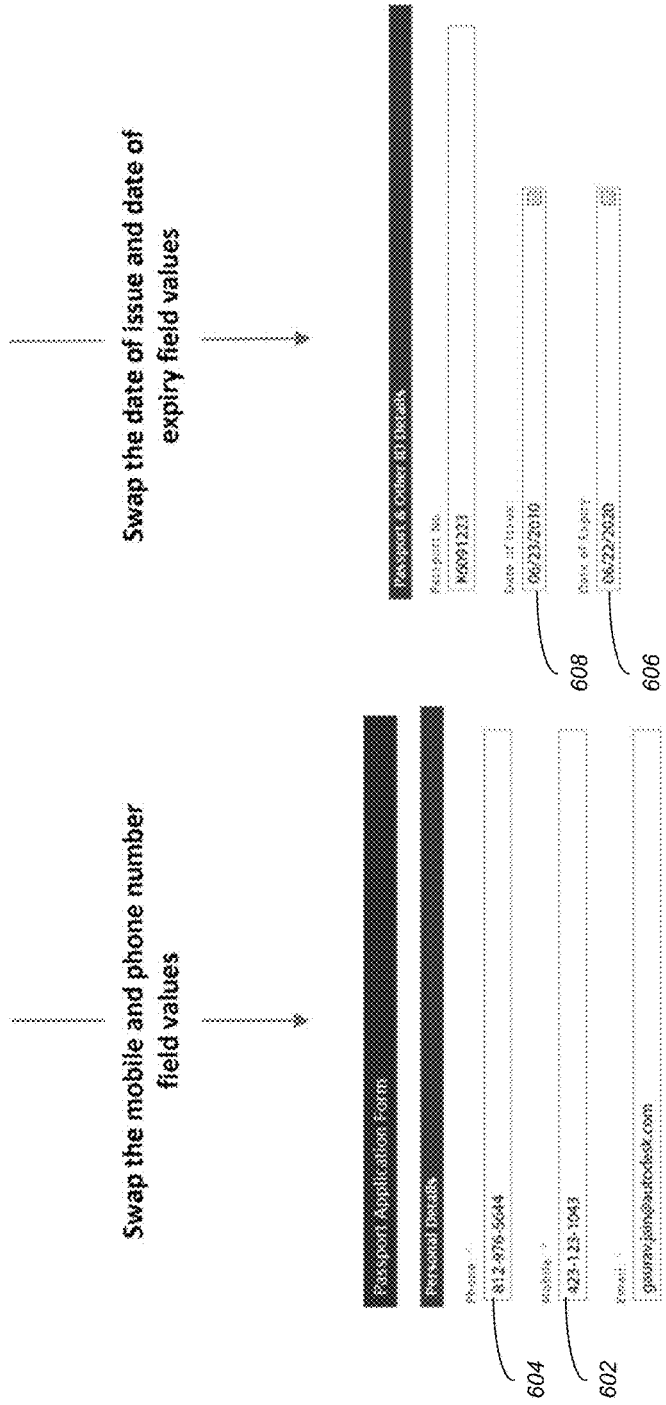
FIG. 6A
FIG. 6B
FIG. 6C
FIG. 6D

Swap the room labels and the person names

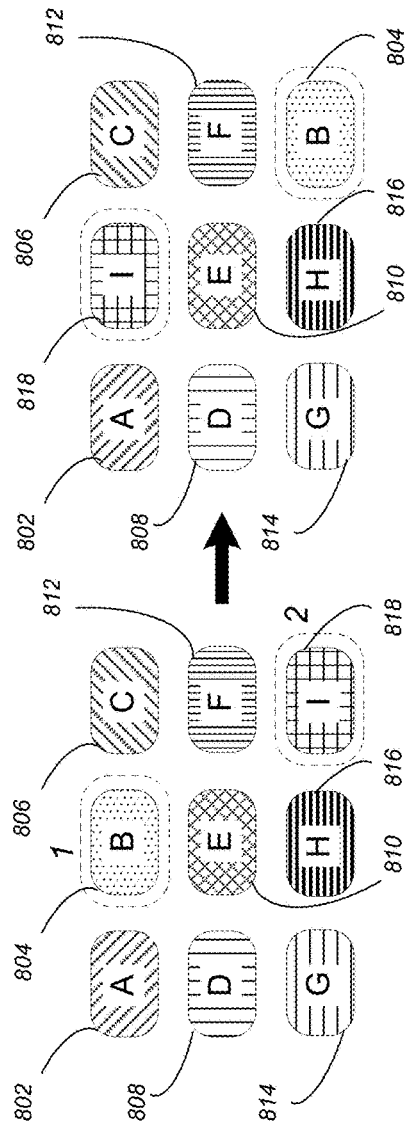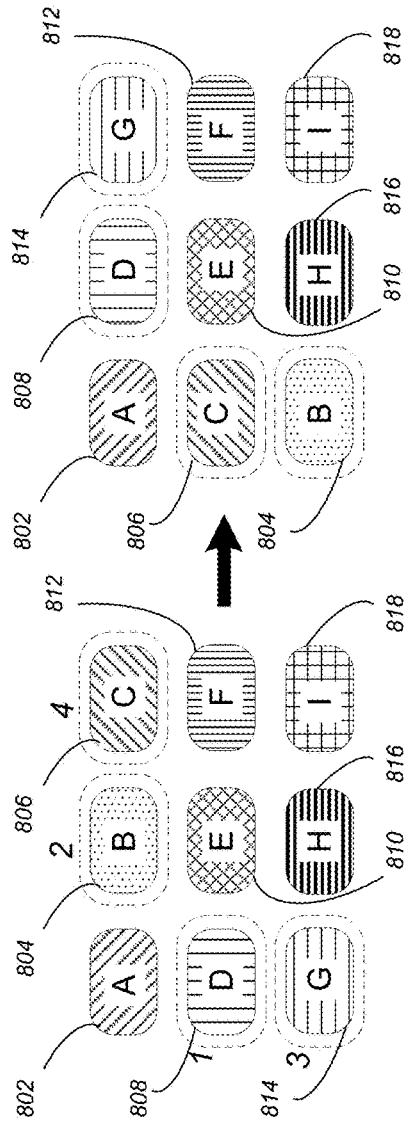

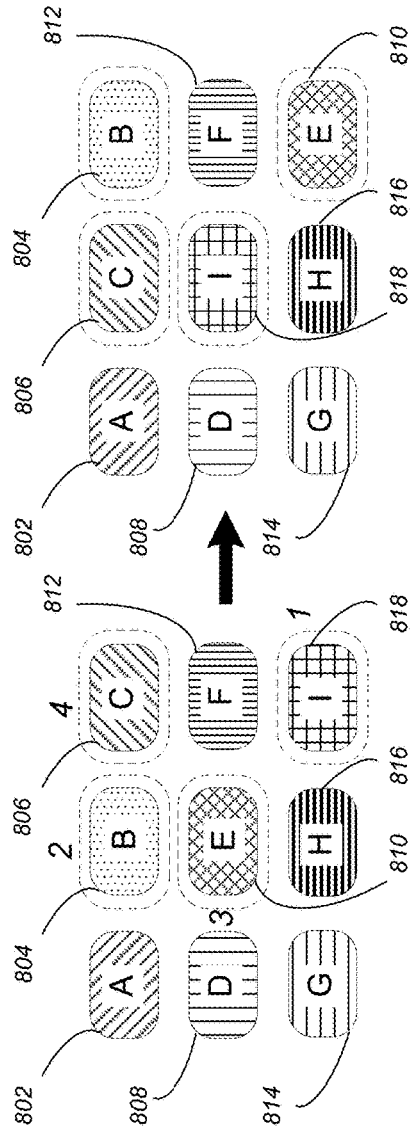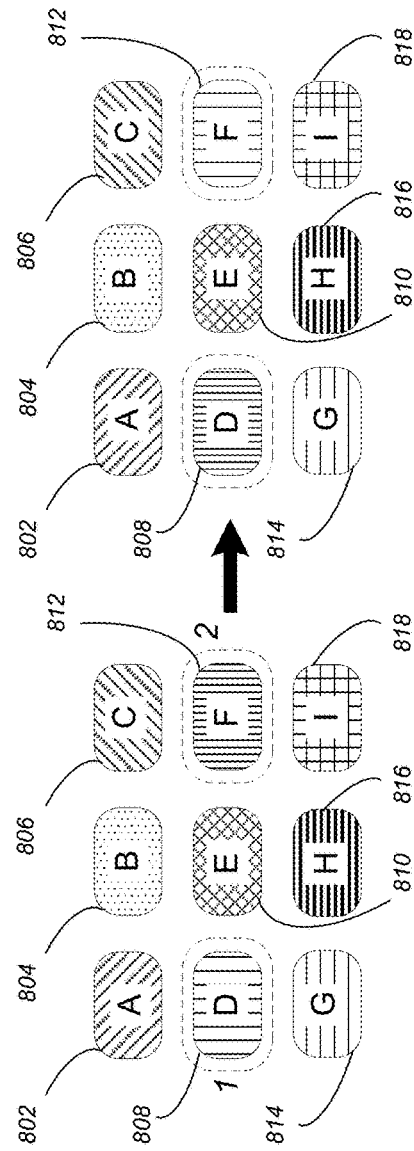

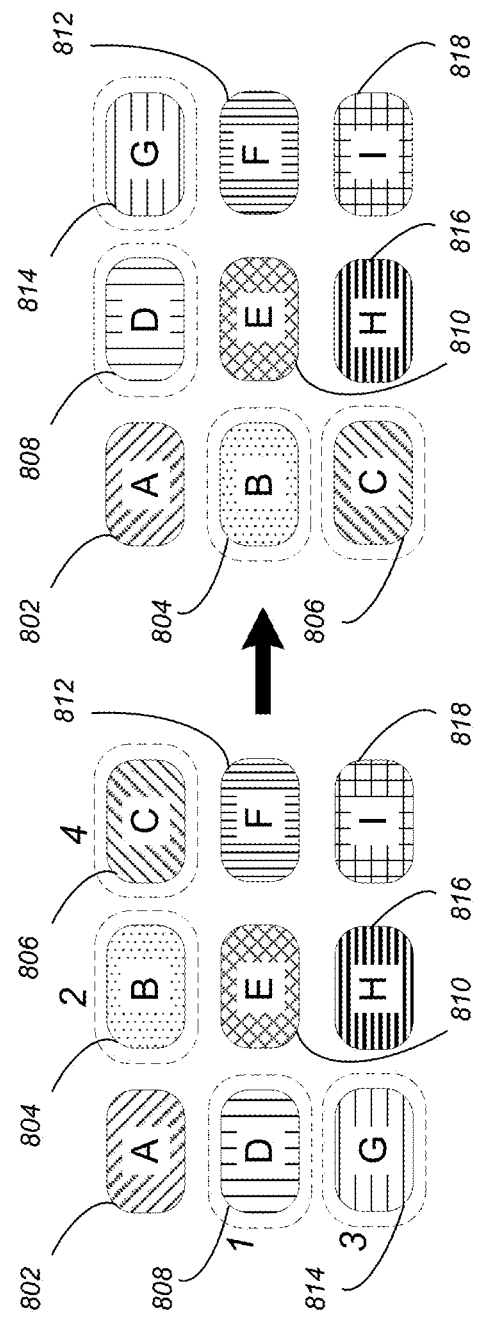

MODIFICATION, MANIPULATION AND RENDERING OF OBJECT ATTRIBUTES

BACKGROUND OF THE INVENTION

1. Field of the Invention

The present invention relates generally to the manipulation of digital objects, and in particular, to a method, system, apparatus, and article of manufacture for the modification and manipulation of multiple digital objects by dynamically interchanging and rendering object attributes.

2. Description of the Related Art

A user often manipulates digital objects or entities while working in various software applications, especially those that allow for editing, drafting, drawing, form creation and other forms of object manipulation. Illustrative examples include the ADOBE PHOTOSHOP application, the ADOBE ILLUSTRATOR application, the AUTOCAD application, and the MICROSOFT POWERPOINT application, as well as many other applications available on computers, mobile devices, and tablets or large panel screen devices. In working with any of these applications, during the process of creating digital objects and setting their layout, a user may sometimes want to "swap" the attributes of two objects that have already been created or "rotate" the attributes between two or more objects. However, there is currently no simple and easy way of achieving such interchanging of digital object attributes (e.g. swap, rotation). Typically, tedious object-by-object attribute changes (especially when three or more objects are involved) are required which oftentimes disrupts a user's general workflow on the project.

One prior art approach to object manipulation is provided in the form of an add-in/supplemental program for the MICROSOFT POWERPOINT application (see mauriziolacava.com/my-addin/). In the add-in, by selecting two graphical objects and pressing a "swap shapes" tool button that executes the add-in program, a user is able to interchange the relative positions of the two graphical objects within the document. However, this add-in program only allows for the interchanging or swapping between two graphical objects and is unable to provide more complex interchanging operations involving a greater number of objects (i.e. more than 2). Moreover, this add-in program only interchanges the positions of the two selected graphical objects and does not allow a user to specify other object attributes to interchange.

Another prior art approach is provided in the ADOBE PHOTOSHOP application. This application allows for the image content of a graphical object to be replaced with another image (see helpx.adobe.com/photoshop/using/create-smart-objects.html#replace_the_contents_of_a_smart_object). A user selects a graphical object and then selects a replacement image to be displayed by the object. This allows for the content of a graphical object inside the application to be replaced with an image imported from outside the application. A similar feature can also be found in a MICROSOFT VISIO editing tool (see blogs.office.com/2012/09/25/10-ways-to-be-more-efficient-in-the-new-visio/). However, neither PHOTOSHOP's feature nor VISIO's feature provides for the interchanging of digital object attributes between two or more objects within the same application. Instead, it merely allows for the replacement of an image for a single graphical object.

Thus, there are currently no mechanisms in the art for easily manipulating multiple digital objects by interchanging non-positional attributes between the digital objects or interchanging object attributes between three or more digital objects. There is a need for the ability to manipulate multiple digital objects in a simple and intuitive manner that saves the user time and does not disrupt the user's overall workflow.

SUMMARY OF THE INVENTION

Embodiments of the invention provide an efficient method for manipulating multiple digital objects by interchanging (e.g. swapping, rotating) one or more object attributes between two or more digital objects or entities. This makes tasks such as editing, drafting or drawing easier by allowing a user to quickly manipulate digital objects within an application running on a computer, touch-screen panel, tablet, mobile or any other portable device. For example, a user may desire to quickly manipulate two or more existing digital objects to try out different combinations or layouts without involving a tedious workflow of duplicating objects and moving them around.

In a typical embodiment, two or more digital objects or entities are positioned on a display or screen in different positions or spatial locations. A user selects two or more of the digital objects by means of a gesture (e.g. clicking on the objects with a cursor control device) or within an editing mode. Once the desired objects are selected, the user executes a command to interchange one or more attributes of the selected objects (e.g. "interchange", "swap", "rotate", "revolve"). The command interchanges certain attributes between the selected objects, while all the other attributes of the objects are retained. In one illustrative implementation, the colors of the objects are interchanged, but the individual positions, sizes, and shapes of the objects are retained. In this way, the invention allows for the seamless and rapid manipulation of digital objects.

The invention provides various advantages over current solutions in the art. Manipulating multiple digital objects is now a simple and natural/intuitive process for the user. Rather than having to learn program/application-specific commands for modifying individual object attributes, a user can simply select multiple objects or entities (similar to how objects are selected in the real world) and interchange one or more of their attributes with the click of a button. This simple sequence of selecting objects followed by a single interchange command can achieve complex multiple object manipulation effects such as interchanging multiple attributes between three or more objects. Tedious actions such as moving, deleting, editing values or properties, re-drawing, re-entering, and copying/pasting individual objects are no longer necessary.

BRIEF DESCRIPTION OF THE DRAWINGS

Referring now to the drawings in which like reference numbers represent corresponding parts throughout:

FIGS. 4A-D provide illustrative examples of interchanging the positions of two graphical objects (FIGS. 4A-B) and three graphical objects (FIG. 4C-D) in accordance with one or more embodiments of the invention;

FIGS. 6A-D provide illustrative examples of interchanging the values contained in phone and mobile fields (FIGS. 6A-B) and date of issue and date of expiry fields (FIGS. 6C-D) in accordance with one or more embodiments of the invention;

FIGS. 8A-J provide a series of illustrative examples of interchanging object attributes between multiple objects in accordance with one or more embodiments of the invention.

DETAILED DESCRIPTION OF THE PREFERRED EMBODIMENTS

Figure 1:
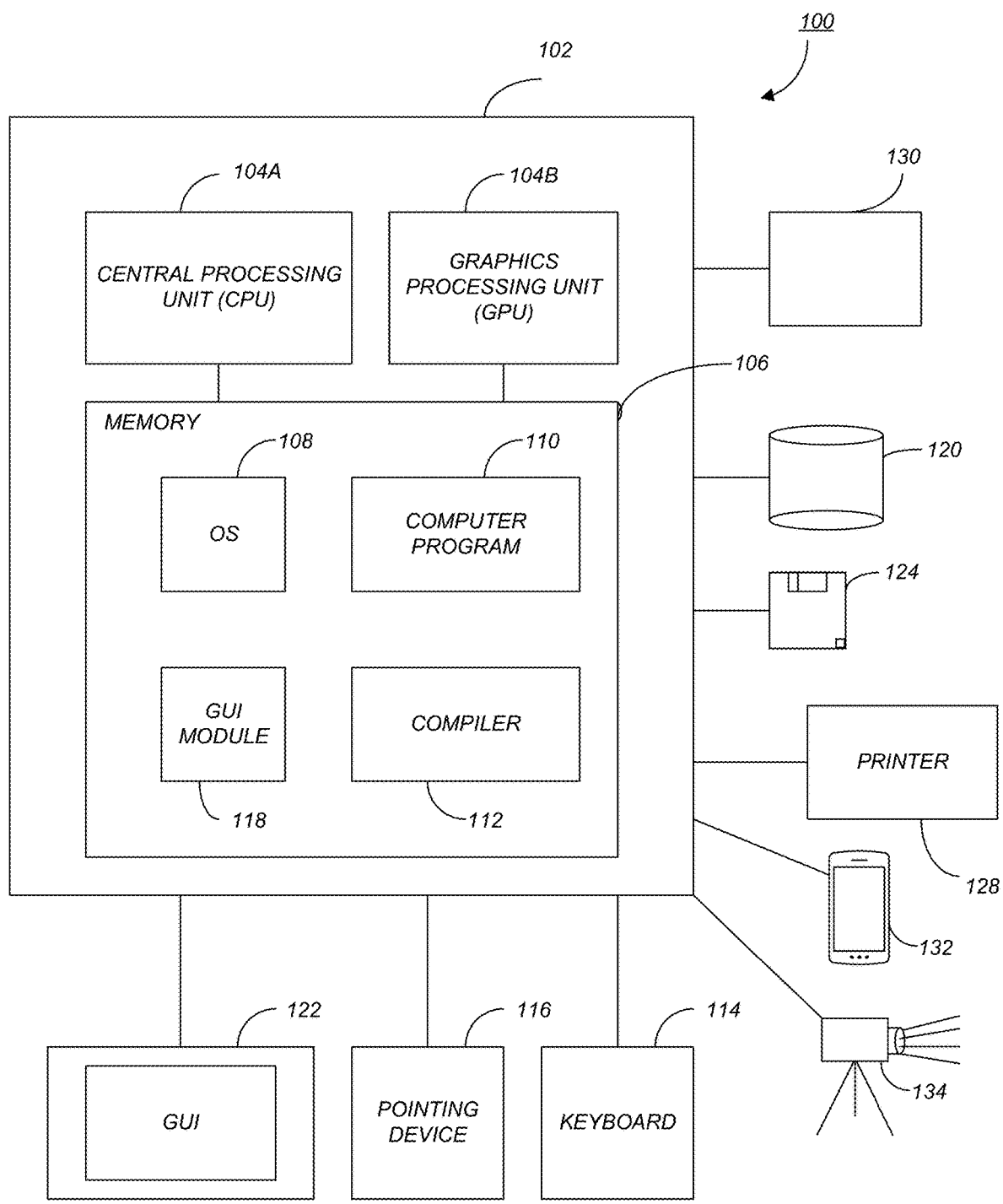
FIG. 1 is an exemplary hardware and software environment used to implement one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.
Overview Embodiments of the invention provide a user with the ability to easily modify, manipulate, and render multiple digital objects by interchanging (e.g. swap, rotate) one or more object attributes between two or more digital objects or entities.
Hardware Environment FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, IPOD, NOOK, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems. In one or more embodiments, computer 102 may be coupled to, and/or integrated with, a scanning device 134. Such a scanning device 134 is configured to scan an object (e.g., text, drawing, picture, etc.) and obtain a digital representative of such an object that may be processed by the computer 102.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as C, C++, Assembly, SQL, PYTHON, PROLOG, MATLAB, RUBY, RAILS, HASKELL, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
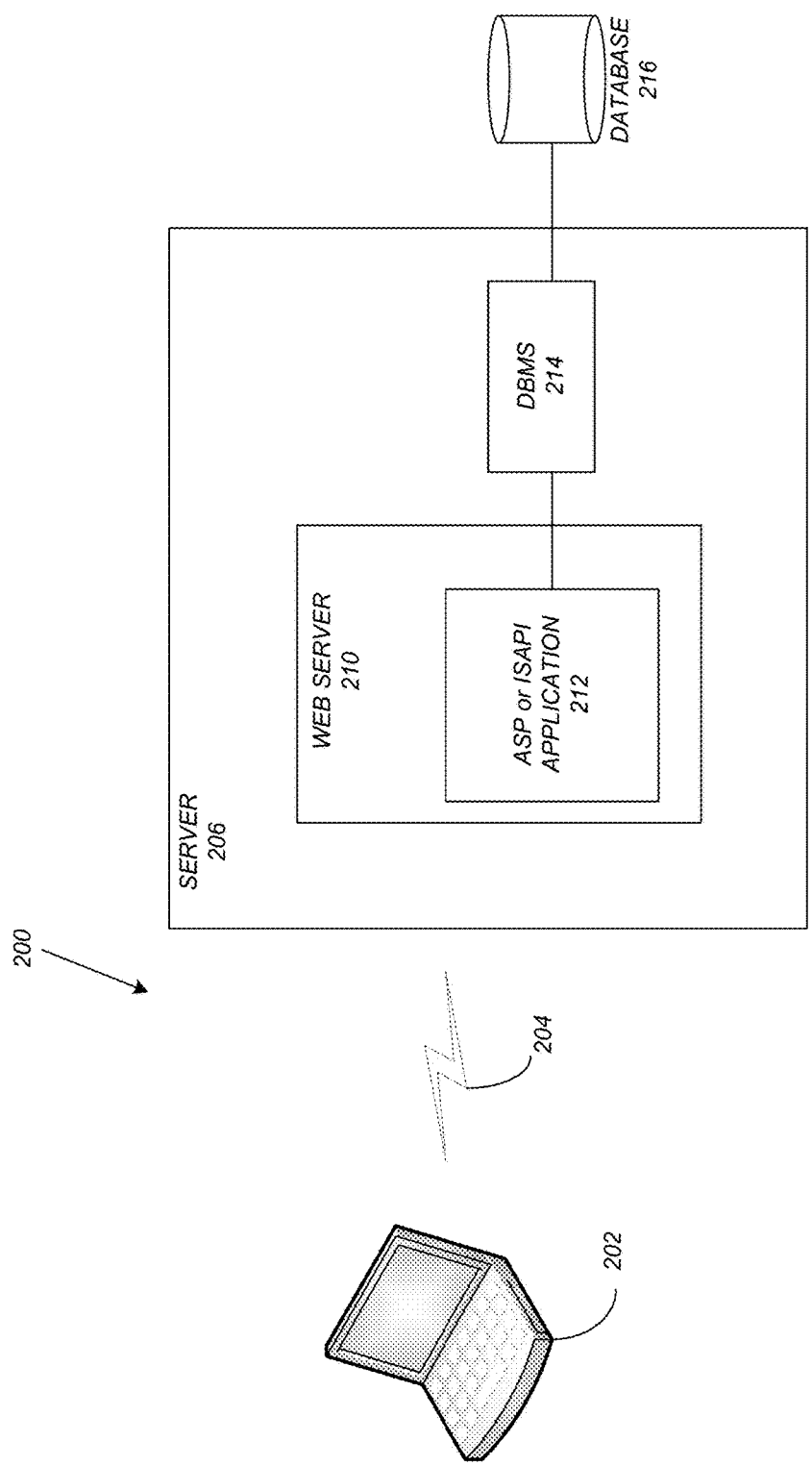
FIG. 2 schematically illustrates a typical distributed/cloud-based computer system using a network to connect client computers to server computers in accordance with one or more embodiments of the invention.

FIG. 2 schematically illustrates a typical distributed/cloud-based computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Further, in a cloud-based computing system, resources (e.g., storage, processors, applications, memory, infrastructure, etc.) in clients 202 and server computers 206 may be shared by clients 202, server computers 206, and users across one or more networks. Resources may be shared by multiple users and can be dynamically reallocated per demand. In this regard, cloud computing may be referred to as a model for enabling access to a shared pool of configurable computing resources.

Clients 202 may execute a client application or web browser and communicate with server computers 206 executing web servers 210. Such a web browser is typically a program such as MICROSOFT INTERNET EXPLORER, MOZILLA FIREFOX, OPERA, APPLE SAFARI, GOOGLE CHROME, etc. Further, the software executing on clients 202 may be downloaded from server computer 206 to client computers 202 and installed as a plug-in or ACTIVEX control of a web browser. Accordingly, clients 202 may utilize ACTIVEX components/component object model (COM) or distributed COM (DCOM) components to provide a user interface on a display of client 202. The web server 210 is typically a program such as MICROSOFT'S INTERNET INFORMATION SERVER.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S TRANSACTION SERVER (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Embodiments of the invention are implemented as a software application on a client 202 or server computer 206. Further, as described above, the client 202 or server computer 206 may comprise a thin client device or a portable device that has a multi-touch-based display. Of course, those skilled in the art will recognize that any combination of the above components, or any number of different components, peripherals, and other devices, may be used with computers 202 and 206.

Software Embodiment Details

Figure 3:
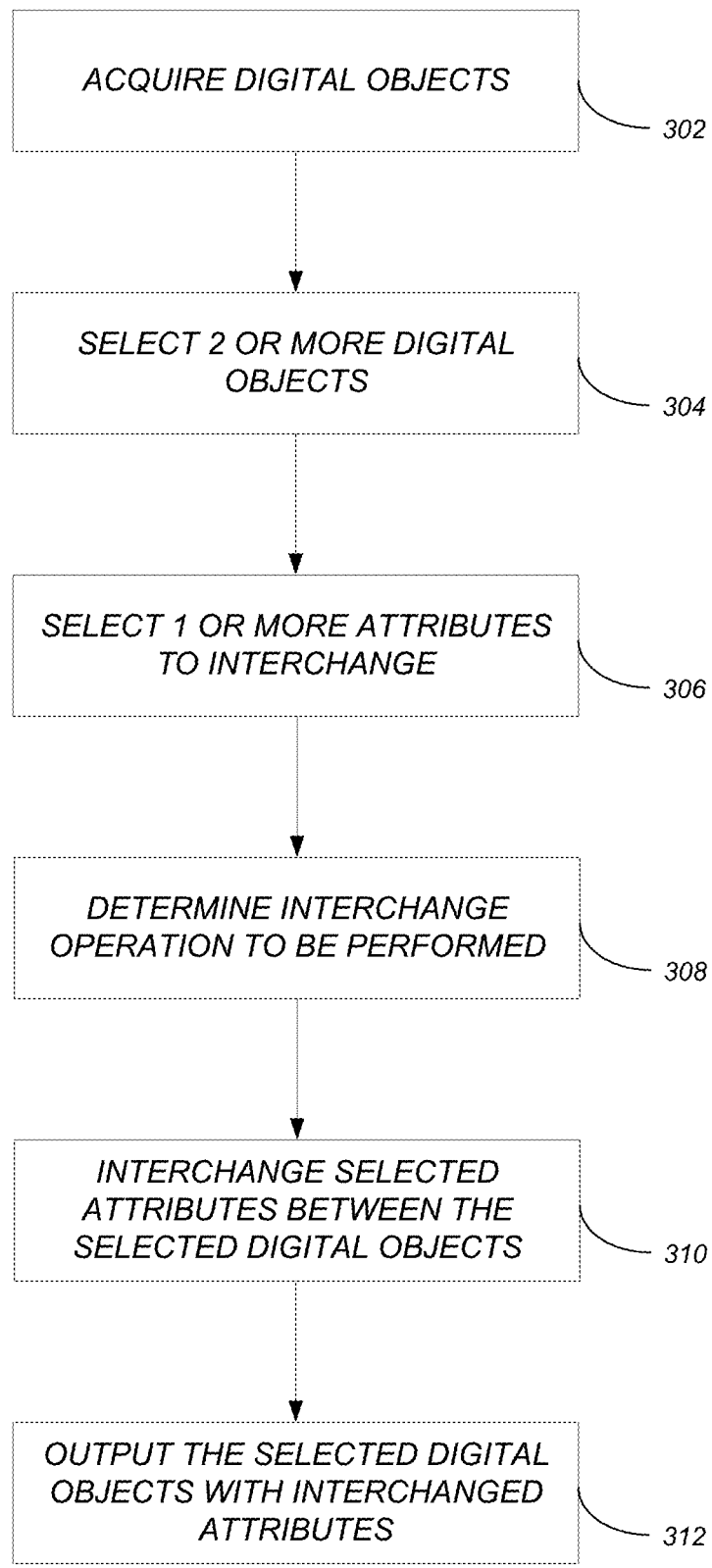
FIG. 3 illustrates the logical flow for manipulating multiple digital objects in accordance with one or more embodiments of the invention.

Embodiments of the invention provide for faster manipulation and seamless editing/modification of multiple digital objects by allowing a user to interchange (e.g. swap, rotate) the attributes of the digital objects (followed by the dynamic rendering of the results). FIG. 3 illustrates the logical flow for manipulating multiple digital objects, in accordance with one or more embodiments of the invention.

At step 302, on one or more computers, a plurality of digital objects or entities comprising one or more attributes are acquired. Digital objects include, but are not limited to, graphics, character strings, text, and numbers. Examples include graphical objects such as user interface (UI) icons (e.g. shapes, groups); application data elements such as form field values; and file system objects such as files or folders. The object or entity may be created, for example, from a digital drawing, entered as a character string, text or number in a form field or converted to a digital form from scanning a physical document. Attributes of the digital objects include, but are not limited to, the position, value, text, size, color, font, image or shape of the digital object.

At step 304, on one or more computers, two or more of the plurality of digital objects are selected. The two or more digital objects may be selected in a specific order. Typically, the order of selection is important—the order defines how the interchange operation will be performed, and on exactly which digital objects. In certain instances, multiple objects may be selected to form a "group" that functions as a single entity to be interchanged with other objects or groups. For example, at least four digital objects are selected, and a subset (e.g., two) of the selected digital objects are grouped as a single entity for the interchanging. In other instances, "pairs" of objects among the selected objects can be indicated. The selected digital objects may be grouped in successive pairs based on the order the digital objects were selected. For example, two successively selected objects would be defined as a "pair" and be grouped together.

At step 306, on one or more computers, one or more (arbitrary, specific, or certain) attributes of the selected digital objects are selected to be interchanged (or not interchanged) depending on the need or context. Allowing selection of arbitrary/certain attributes enables selection of certain/any attributes designated and/or selected by the user. In certain embodiments, a user may be given the option of selecting one or more attributes of the selected digital objects to interchange or retain. Interchangeable attributes can be any data or value associated with the object and include, but are not limited to, the position, value, text, size, color, font, image, shape etc. of the object. In other embodiments, the one or more object attributes to be interchanged are pre-determined to simplify the operation (e.g. only interchange the location of two objects without changing any other attributes) or based on a previous selection by the user.

At step 308, once all the desired objects are selected, an interchange operation to be performed with the selected attributes of the selected digital objects is determined. This may be specified by clicking on a graphical icon or a user selection from multiple menu options that appear at the end of the object selection, or by any other application specific means. A user may specify a simple interchange of attributes between one or more pairs of digital objects. In instances where only two objects are selected, the user may be only provided with the option of proceeding or not proceeding with an interchange of the selected attributes (i.e. swap). In instances where three or more objects are selected, the user may specify whether the attributes are interchanged in an order following or in reverse to the order the digital objects were selected (i.e. rotation). The user may also specify the number of times the interchange operation is repeated following or in reverse to the order the digital objects were selected. In some embodiments, the user is further provided with an option of a multi-swap functionality that interchanges the attributes of two or more pairs of selected objects in a single command.

In one exemplary embodiment, the objects are selected in a specific order in step 304, and during step 308, the selected attributes are replaced by the selected attributes of another selected object based on the specific order. In a second exemplary embodiment, the selected digital objects (after selection in a specific order) are grouped in successive pairs based on the specific order, and the selected attributes are interchanged between digital objects within each successive pair. In a third exemplary embodiments, a specific order in which to perform the interchanging (e.g., forward/reverse) is specified. Thereafter, a number of steps for the interchanging is specified. Such a number of steps determines a number of positions to skip in the specific order (and/or the number of times to repeat) when performing the interchanging (e.g., rotating objects by two steps, swapping colors for every three objects, or repeating a rotation/swap the specified number of steps).

At step 310, upon determination of the specific interchange operation to be performed, the selected certain attributes are interchanged between the selected digital objects based on the determined interchange operation. One or more certain attributes are interchanged between the two or more selected objects. In one illustrative implementation, one or more attributes between two selected objects are interchanged (i.e., swapping the desired attributes between the objects). In another illustrative implementation, the attributes of three or more selected objects are successively interchanged (i.e., rotating amongst the selected objects) by a specific number of positions, based on the direction of selection (e.g., following or in reverse to the direction or order that the objects were selected). For example, the color of selected objects may be rotated by one (1) position in the direction of selection. In instances where the interchange operation is to follow the order the digital objects were selected, the selected attributes for each selected digital object are replaced with the selected attributes of the following digital object and the selected attributes for the last selected digital object are replaced with the selected attributes of the first selected digital object. This interchange operation may be repeated a set number of times. In instances where the interchange operation is to be in reverse to the order the digital objects were selected, the selected attributes for each selected digital object are replaced with the selected attributes of the preceding digital object and the selected attributes for the first selected digital object are replaced with the selected attributes of the last selected digital object. This interchange operation may also be repeated a set number of times.

In yet another illustrative implementation, a multi-swap is performed where adjacent or successive pairs of objects are interchanged based on and/or in the order of their selection. In instances where the selected digital objects are grouped in successive pairs based on the order the digital objects were selected, the selected attributes for the selected digital objects are interchanged between the selected digital objects within each successive pair. For example, if four objects are selected in the order from first to last (i.e., object 1, object 2, object 3, object 4), the multi-swap operation would result in the attribute of object 1 being interchanged with object 2, and the attribute of object 3 being interchanged with object 4. This provides a faster way to interchange object attributes separately between multiple object pairs with a single command.

At step 312, on/via one or more computers, the selected digital objects with interchanged attributes are output. In typical embodiments, the digital objects are output. For example, the digital objects may be output by dynamically rendering the objects on a display to provide the user with a visual feedback of the manipulation. Alternatively, the selected digital objects with interchanged attributes may be output by plotting/pointing the objects, sending the objects to another user/computer, etc.

EXAMPLES

Further illustrative implementations of embodiments of the invention are provided in the following examples.

Example 1—Swapping/Rotating Object Positions

In one illustrative use case as shown in FIGS. 4A-D, a user is creating an illustration of photo frames that are to be positioned on a wall for a gallery display. As the user creates an initial layout 400, the user may really like the layout 400 and saves the drawing/layout 400. Each frame 402-418 (in the layout 400) is in a different position, shape, and color. In FIGS. 4A-4D, the different shading/patterning of the frames 402-418 is used to represent different colors. For example, the different hatch patterns in frames 402, 404, 406, 408, 410, 412, 414, 416, and 418, may represent orange, yellow, dark green, dark purple, blue, green, light green, light purple, and red respectively. As the user thinks more about it, though, other layout ideas start popping up in the user's head. The user desires to manipulate the positions of the photo frames 402-418 to try out different layouts.

In one embodiment of the invention, FIGS. 4A-B show the user interchanging (swapping) (as depicted by arrow 420) the position of frame 402 with frame 412 (while retaining all the other attributes of the frames 402 and 412 such as color, size, and shape) to provide a more pleasing/preferred layout. FIG. 4A shows the original position/layout 400 of the frames. Frames 402 are 412 are selected and with a single click of a computer mouse, the positions of the two frames are interchanged with the layout 422 shown in FIG. 4B.

In another embodiment of the invention, FIGS. 4C-D show the user successively interchanging (rotating) (as depicted by arrow 424) the positions of frames 404, 416, and 410 anti-clockwise to provide a better fitting/preferred layout. FIG. 4C shows the original layout 400 of the frames (similar positions as in FIG. 4A). The three frames 404, 416, and 410 (e.g., in that order) are selected (e.g., as set forth in step 304) and then the positions of the frames are successively interchanged in the direction indicated by arrow 424 such that they are in new positions while retaining all their other attributes. In this regard, the selection order of frames 404, 416, and 410 determines the directional rotation of arrow 424, and once the desired attribute to interchange have been selected (e.g., the position, via specific selection by the user or a predetermined default), the respective attribute (e.g., position) of the selected objects 404, 410, 416 is rotated. The resulting layout 426 is illustrated in FIG. 4D.

Example 2—Swapping/Rotating Object Attributes

Embodiments of the invention allow the user to interchange any attribute and not just the position of the digital object. In another illustrative use case as shown in FIGS. 5A-D, a user is creating a balloon decoration with a bunch of balloons of different colors. The user creates a bunch with a particular color combination. In this illustration, the different shading/patterning of the balloons as shown in the figures is used to represent different colors, for example, the different hatch patterns in balloons 502, 504, and 506 may represent green, red, and yellow balloons, respectively. The user may want to try different variations by interchanging colors between the balloons 502-506, while keeping/maintaining the position and layout of the balloons 502-506 the same.

Figure 5A:
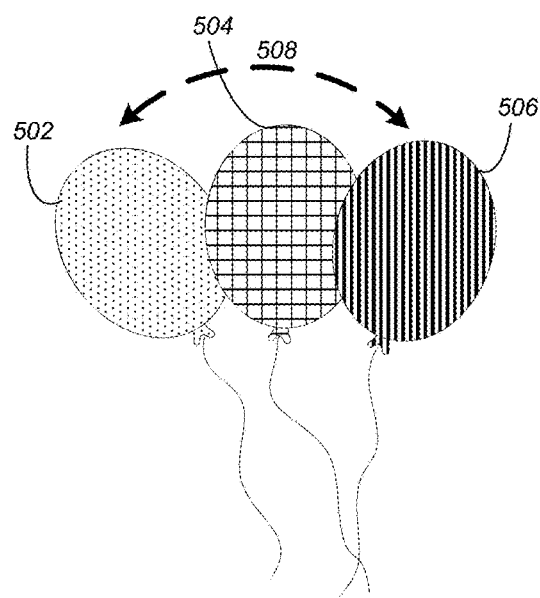
FIGS. 5A-D provide illustrative examples of interchanging the colors of two graphical objects (FIGS. 5A-B) and three graphical objects (FIGS. 5C-D) in accordance with one or more embodiments of the invention.
Figure 5B:
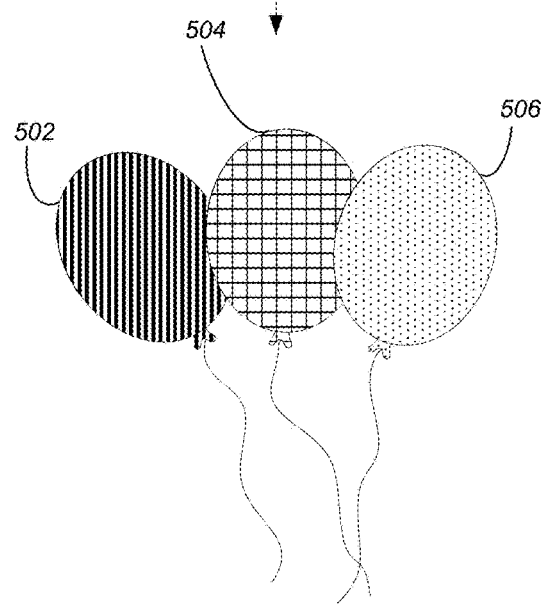

In one embodiment of the invention, FIGS. 5A-B show the user interchanging (swapping) 508 the color of the left balloon 502 with the right balloon 506 (while retaining all the other attributes of the balloons 502-506 such as position and layering order). Thus, at step 304, the two balloons 502 and 506 are selected. At step 306, the color attribute is selected. FIG. 5A shows the original attributes/layout of the balloons 502-506. In FIG. 5B, the color attribute of left balloon 502 has been swapped with the color attribute of the right balloon 506 (i.e., at step 310). As reflected by the shading/patterning, the color attribute of the balloons has been interchanged but not the positions/position attribute.

Figure 5C:
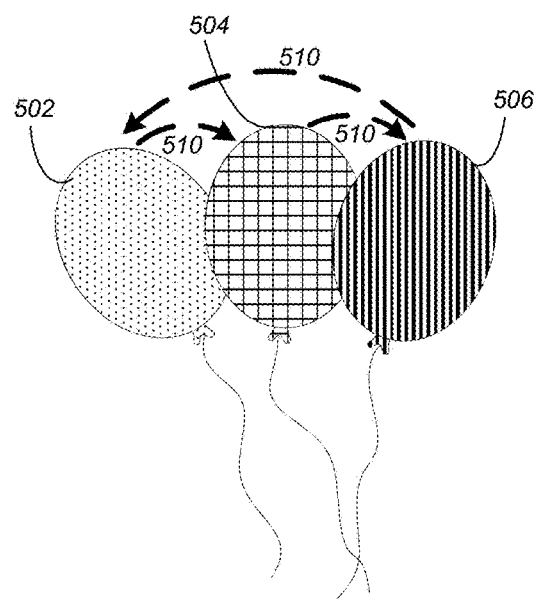
Figure 5D:
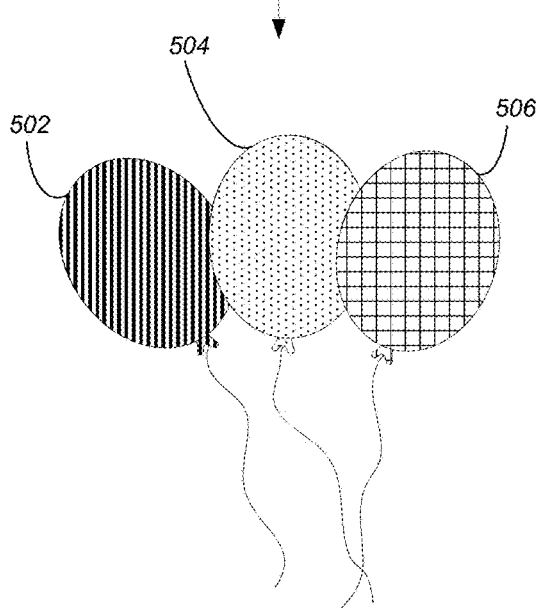

In another embodiment of the invention, FIGS. 5C-D show the user successively interchanging (rotating) 510 the colors of the left balloon 502, center balloon 504, and right balloon 506 one step. Similar to FIG. 5A, FIG. 5C shows the original attributes/layout of the balloons 502-506. At step 304, the balloons have been selected in the order 502, 504, 506. Further, the color attribute has been selected for interchange at step 306 of FIG. 3. The interchange operation determined in step 308 is that of rotating the color attribute one step based on the order of balloon selection. FIG. 5D illustrates the result of performing the operation at step 310 (i.e., the output of step 312). In FIG. 5D, the left balloon 502 is now the color of the original right balloon 506, the center balloon 504 is now the color of the original left balloon 502, and the right balloon 506 is now the color of the original center balloon 504. Had a different selection order been performed (e.g., 506, 504, 502), the color swap would reflect such a selection order.

Example 3—Swapping Values in a Form Field

Embodiments of the invention allow the user to interchange character strings or values in a form field. In another illustrative use case as shown in FIGS. 6A-D, a user is filling out a passport renewal application form online and meticulously fills each and every field. It takes a lot of time, but the user finally finishes filling the form, and just before submitting the form, the user reviews the data to make sure that everything was entered correctly. That's when the user notices that two fields were entered incorrectly: 1) the direct-line phone number, instead of being entered in the designated field 602, was entered in the mobile number field 604, and vice versa (FIG. 6A), and 2) the passport expiry date, instead of being entered in the designated field 606, was entered in the passport issue date field 608, and vice versa (FIG. 6C). By selecting the fields 602, 604, 606, and 608 that have incorrectly entered values (i.e., at step 306 of FIG. 3) and interchanging (swapping) the values in these form fields, the user is able to correct these two mistakes without having to re-type or copy/paste anything (as shown in FIGS. 6B and 6D). In other words, referring to FIG. 6A, the user merely selects fields 602 and 604 (i.e., in step 306), determines an interchange/swap operation should be performed (i.e., in step 308), and executes the selected operation to swap the two fields 602-604. A similar sequence may be performed for field 606-608 in FIGS. 6C and 6D.

Embodiments of the invention apply to any situation where the user wants faster manipulation of the attributes of any digital object that has already been entered or when the user wants to minimize the need to reenter, retype, etc. the values entered in the digital object. For example, if a user has already filled in data in various form fields in the wrong order, embodiments of the invention allow the user to interchange the values without reentering the information, which saves the user time.

Example 4—Swapping Pairs of Objects in a CAD Layout Plan

Figure 7A:
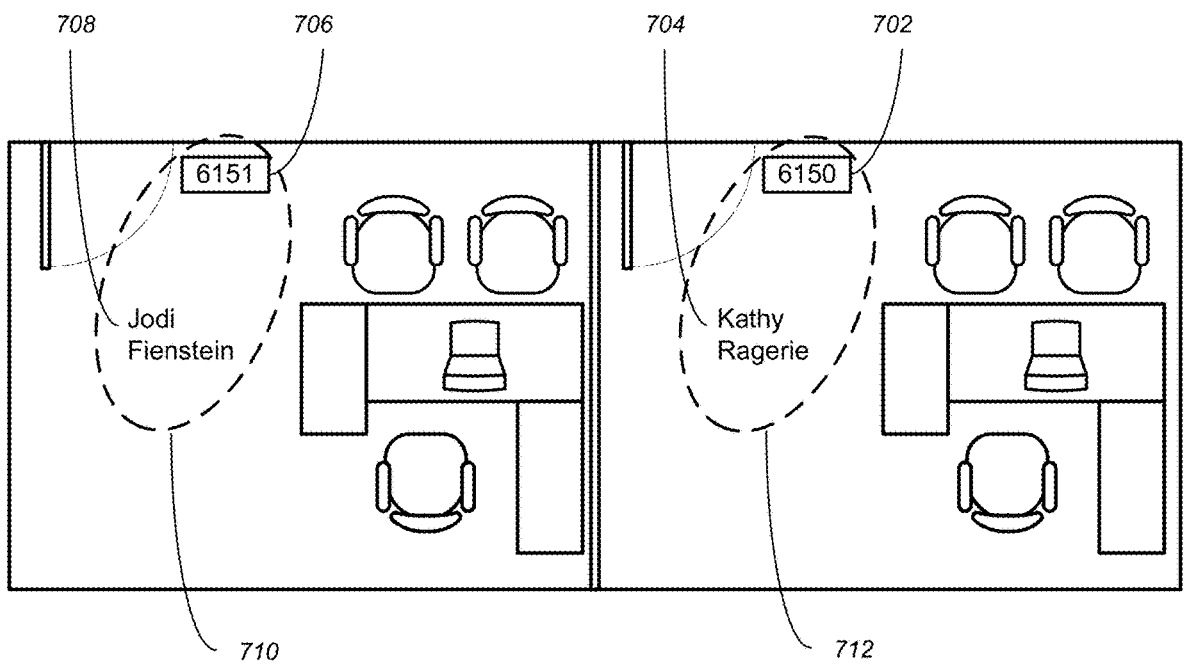
FIGS. 7A-B provide an illustrative example of interchanging pairs of objects in a computer-aided design (CAD) layout plan in accordance with one or more embodiments of the invention.
Figure 7B:
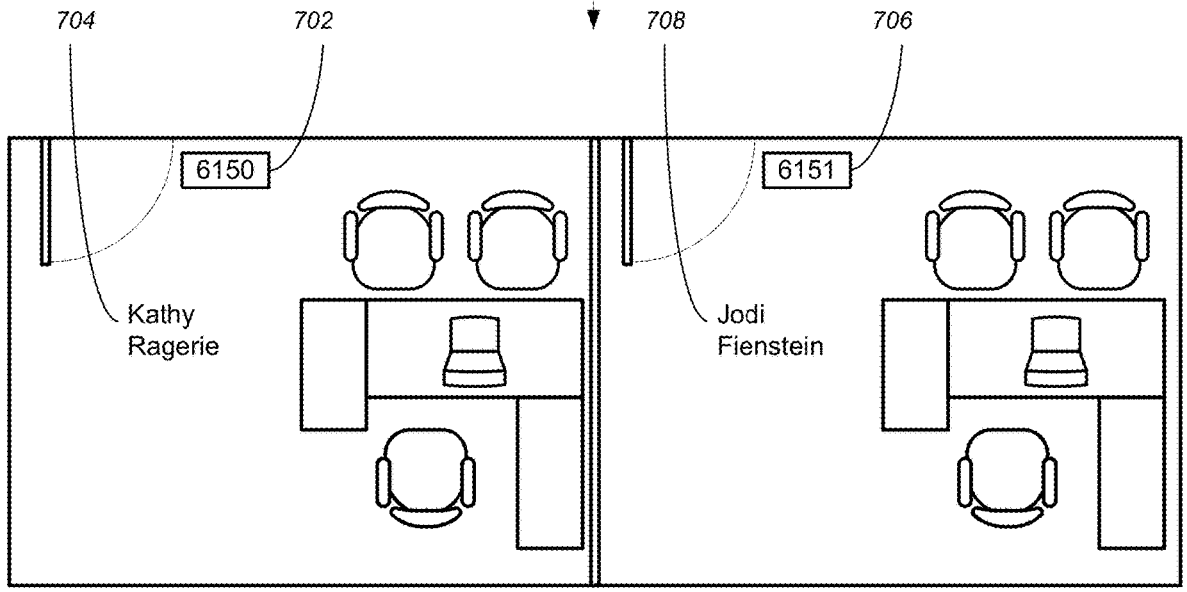

In another illustrative use case as shown in FIGS. 7A-B, a user is reviewing a draft of an office floor plan and notices that the room numbers and person names for two rooms in the floor plan are incorrectly labeled and need to be interchanged. In particular, the user notices that room #6150 702 that belongs to Kathy Ragerie 704 should really be the one on the left room that is currently labeled as room #6151 706 with Jodi Fienstein 708. Consequently, the user wants to interchange the names and room numbers to fix this error.

In one embodiment of the invention, as shown in FIG. 7A, the user specifies room #6151 706 and Jodi Fienstein 708 as a first group 710 and room #6150 702 and Kathy Ragerie 704 as a second group 712. Multiple different selection techniques may be utilized. For example, the user may simply use a computer mouse to select room #702 and name 704 while holding down the <CTRL> or <ALT> key on the keyboard. Alternatively, a selection box/circle/oval may be used to enclose the desired objects. In yet another embodiment, the user can simply use a finger to circle the desired objects (e.g., on a touchscreen tablet device).

Once the appropriate groups/pairs of objects are selected, the first group 710 and second group 712 are treated as single entities that are interchanged. As shown in FIG. 7B, this results in both the name and room number of first group 710 to move to the right room and both the name and room number of the second group 712 to move to the left room.

Example 5—Swapping Object Attributes, Positions, and Pairs

FIGS. 8A-J provide a series of illustrative examples of interchanging object attributes between multiple objects in accordance with one or more embodiments of the invention. Within each three by three layout, the individual digital objects 802-818 have the same shape, but different colors, positions, and text. The italicized numbers (1-5) in the figures depict the order of user actions in selecting the digital objects and specifying the interchange operation. In this series of illustrative examples, the different shading/patterning of the rectangles as shown in the figures is used to represent different colors, for example rectangle 802 with "A" text is brown, rectangle 804 with "B" text is green, rectangle 806 with "C" text is pink, rectangle 808 with "D" text is blue, rectangle 810 with "E" text is yellow, rectangle 812 with "F" text is red, rectangle 814 with "G" text is grey, rectangle 816 with "H" text is purple, and rectangle 818 with "I" text is light blue.

FIGS. 8A-B illustrate interchanging the positions of two objects. More specifically, FIGS. 8A-B illustrate interchanging the positions of rectangle 804 with rectangle 818. In FIG. 8A, rectangle 804 is selected at step 1, followed by rectangle 818 at step 2. An interchange operation to swap object positions is then determined at step 3. In FIG. 8B, the resulting output shows rectangle 804 (retaining its color [as reflected by the hatch patterning] and "B" text) now in the position where rectangle 818 was originally and rectangle 818 (retaining its color and "I" text) now in the position where rectangle 804 was originally.

FIGS. 8C-D illustrate successively interchanging the positions of four objects by one step in the same order that the objects were selected (numbers 1-4 indicate the selection order). In FIG. 8C, rectangle 808 is first selected at step 1, followed by rectangles 804 (at step 2), 814 (at step 3), and 806 (at step 4). An interchange operation to successively interchange object positions by one step following the order of selection is then determined (at step 5). The position for each selected rectangle 808, 804, 814, 806 is replaced with the position of the following selected rectangle and the position for the last selected rectangle 806 is replaced with the position of the first selected rectangle 808. This interchange operation is only performed one time (i.e. one step). In other words, in the resulting output as shown in FIG. 8D, the position of rectangle 808 is replaced with the position of rectangle 804, the position of 804 is replaced with the position of 814, the position of 814 is replaced with the position of 806, and the position of rectangle 806 is replaced with the position of 808. While the rotation of object positions is described above, alternative embodiments of the invention may provide for rotating the color attribute of the selected objects while maintaining the object position.

FIG. 8E-F illustrate successively interchanging the positions of four objects by two steps in the reverse order that the objects were selected (numbers indicate the selection order). In FIG. 8E, rectangle 818 is first selected (at step 1), followed by rectangles 804 (at step 2), 810 (at step 3), and 806 (at step 4). An interchange operation to successively interchange object positions by two steps in reverse to the order of selection is then determined (at step 5). The position for each selected rectangle is replaced with the position of the rectangle selected two positions earlier, and the position for the first selected rectangle is replaced with the position of the second-to-last selected rectangle. Thus, the position of rectangle 818 is replaced with the position of rectangle 810, the position of 804 is replaced with the position of 806, the position of 810 is replaced with the position of 818, and the position of rectangle 806 is replaced with the position of 804. The resulting position of the rotated objects is illustrated in FIG. 8F.

In view of the examples illustrated in FIGS. 8C-8F, embodiments of the invention enable the selection of two different options when determining the rotation of the objects: (1) the order of rotation/swapping (e.g., forward/reverse direction); and (2) the number of positions to rotate/swap (e.g., one step, two step, three step, etc.).

FIGS. 8G-H illustrate interchanging the colors of two objects without interchanging their positions. In FIG. 8G, rectangle 808 is selected (at step 1), followed by rectangle 812 (at step 2). An interchange operation to swap object shading/patterning is then determined (at step 3). In FIG. 8H, the resulting output shows rectangle 808 (retaining its position and "D" text) now with the color of rectangle 812 and rectangle 812 (retaining its position and "F" text) now with the color of rectangle 808.

FIGS. 8I-J illustrate interchanging the positions of two pairs of objects (objects B and C are interchanged with objects D and G). In FIG. 8I, rectangle 808 is first selected (at step 1), followed by rectangles 804 (at step 2), 814 (at step 3), and 806 (at step 4). Purely based on the selection order, rectangles 808 and 804 are grouped as a pair, and rectangles 814 and 806 are grouped as a pair. An interchange operation to interchange object positions within each pair is then determined (at step 5). In FIG. 8J, the resulting output shows the position of rectangle 808 switched with the position of rectangle 804 and the position of rectangle 814 switched with the position of rectangle 806. Accordingly, in one or more embodiments, once the objects are selected in steps 1-4, the user specifies/determines the swap/rotation that is to be performed at step 5. Such a selection of the swap/rotation operation may also specify that the swap/rotation operation is to be performed based on pairs of selected objects. In other words, the user may select (1) the direction of operation (e.g., forward/reverse); (2) the number of positions (e.g., one step, two step, etc.); and (3) whether the swap/rotation should be performed based on object pairing/groups. Thereafter, the system automatically, dynamically, and without further user input, pairs the selected objects (based on the selection order) and performs the swap/rotation operation.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for manipulating three or more digital objects, comprising:
    (a) acquiring, on a computer, a plurality of digital objects, wherein each of the plurality of digital objects comprises one or more attributes;
    (b) selecting, on the computer, three or more of the plurality of digital objects, wherein the three or more of the plurality of digital objects are selected in a specific order;
    (c) selecting, on the computer, one or more attributes of the one or more attributes, of the selected three or more of the plurality of digital objects, to interchange;
    (d) determining, on the computer, an interchange operation to be performed with the selected one or more attributes;
    (e) interchanging, on the computer, the selected one or more attributes between all of the selected digital objects based on the determined interchange operation, wherein the interchanging comprises replacing the selected one or more attributes for each selected digital object with the selected attributes of another of the selected digital objects based on the specific order; and
    (f) outputting, on one or more computers, the selected digital objects with interchanged attributes.

2. The computer-implemented method of claim 1, wherein:
    the selecting the three or more of the plurality of digital objects comprises selecting at least four of the plurality of digital objects;
    the method further comprising grouping a subset of the selected at least four of the plurality of digital objects, wherein the subset is grouped as a single entity for the interchanging.

3. The computer-implemented method of claim 1, wherein a user selects the one or more attributes of the selected digital objects to interchange.

4. The computer-implemented method of claim 1, wherein a user selects the one or more attributes of the selected digital objects to retain.

5. The computer-implemented method of claim 1, wherein the one or more attributes of the selected digital objects to interchange is pre-determined.

6. The computer-implemented method of claim 1, wherein:
    (a) the selected digital objects are grouped in successive pairs based on the specific order; and
    (b) the selected attributes for the selected digital objects are interchanged between the selected digital objects within each successive pair.

7. The computer-implemented method of claim 1, wherein selecting the interchange operation comprises:
    specifying a number of steps for the interchanging, wherein the number of steps determines a number of positions to skip in the specific order when performing the interchanging.

8. The computer-implemented method of claim 1, wherein selecting the interchange operation comprises:
    specifying a number of steps for the interchanging, wherein the number of steps determines how many times to repeat the interchanging.

9. A system for manipulating three or more digital objects on a computer system comprising:
    (a) a computer comprising a processor; and
    (b) an application executed by the processor on the computer, wherein the application:
        (1) acquires a plurality of digital objects, wherein each of the plurality of digital objects comprises one or more attributes;
        (2) selects three or more of the plurality of digital objects, wherein the three or more of the plurality of digital objects are selected in a specific order;
        (3) selects one or more attributes of the one or more attributes, of the selected three or more of the plurality of digital objects, to interchange;
        (4) determines an interchange operation to be performed with the selected one or more attributes;
        (5) interchanges the selected one or more attributes between all of the selected digital objects based on the determined interchange operation, wherein the interchange comprises replacing the selected one or more attributes for each selected digital object with the selected attributes of another of the selected digital objects based on the specific order; and
        (6) outputs the selected digital objects with interchanged attributes.

10. The system of claim 9, wherein:
    the application selects the three or more of the plurality of digital objects by selecting at least four of the plurality of digital objects; and
    the application groups a subset of the selected at least four of the plurality of digital objects, wherein the subset is grouped as a single entity for the interchanging.

11. The system of claim 9, wherein a user selects the one or more attributes of the selected digital objects to interchange.

12. The system of claim 9, wherein a user selects the one or more attributes of the selected digital objects to retain.

13. The system of claim 9, wherein the one or more attributes of the selected digital objects to interchange is pre-determined.

14. The system of claim 9, wherein:
   (a) the selected digital objects are grouped in successive pairs based on the specific order; and
   (b) the selected attributes for the selected digital objects are interchanged between the selected digital objects within each successive pair.

15. The system of claim 9, wherein the application selects the interchange by:
   specifying a number of steps for the interchanging, wherein the number of steps determines a number of positions to skip in the specific order when performing the interchanging.

16. The system of claim 9, wherein the application selects the interchange operation by:
   specifying a number of steps for the interchanging, wherein the number of steps determines how many times to repeat the interchanging.

\* \* \* \* \*